United States Patent
Wang et al.

(10) Patent No.: US 10,706,764 B2
(45) Date of Patent: Jul. 7, 2020

(54) METHOD AND DEVICE FOR CORRECTING COLOR DEVIATION FOR BENDING REGION OF CURVED SCREEN

(71) Applicant: Wuhan China Star Optoelectronics Semiconductor Display Technology Co., Ltd., Wuhan (CN)

(72) Inventors: Wei Wang, Wuhan (CN); Yaojen Chang, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 0 days.

(21) Appl. No.: 16/326,223

(22) PCT Filed: Nov. 5, 2018

(86) PCT No.: PCT/CN2018/113959
§ 371 (c)(1),
(2) Date: Feb. 18, 2019

(87) PCT Pub. No.: WO2020/034445
PCT Pub. Date: Feb. 20, 2020

(65) Prior Publication Data
US 2020/0126468 A1 Apr. 23, 2020

(30) Foreign Application Priority Data
Aug. 17, 2018 (CN) .......................... 2018 1 0938418

(51) Int. Cl.
*G09G 3/20* (2006.01)
*G06T 7/00* (2017.01)
*G09G 3/3208* (2016.01)

(52) U.S. Cl.
CPC ......... *G09G 3/2003* (2013.01); *G06T 7/0006* (2013.01); *G09G 3/3208* (2013.01); *G06T 2207/10024* (2013.01); *G06T 2207/30148* (2013.01); *G09G 2320/0233* (2013.01); *G09G 2320/0242* (2013.01)

(58) Field of Classification Search
CPC ......... G09G 3/2003; G09G 2320/0233; G09G 2320/0242; G06T 2207/10024
See application file for complete search history.

(56) References Cited

U.S. PATENT DOCUMENTS

2016/0210901 A1* 7/2016 Cha .......................... G09G 5/10

\* cited by examiner

*Primary Examiner* — Dennis P Joseph

(57) ABSTRACT

First photographed images taken at a plurality of angles and brightness information of each of the first photographed images are obtained. According to the brightness information of each of the colors, a relational model is established. Second photographed images taken at a plurality of angles and brightness distribution information of each of the second photographed images are obtained. The brightness distribution information is corrected based on the relational model. Measured brightness values are obtained, and gray level correction values for a preset gray level is calculated. Color deviation is corrected based on the gray level correction values.

9 Claims, 2 Drawing Sheets

METHOD AND DEVICE FOR CORRECTING COLOR DEVIATION FOR BENDING REGION OF CURVED SCREEN

RELATED APPLICATIONS

This application is a National Phase of PCT Patent Application No. PCT/CN2018/113959 having International filing date of Nov. 5, 2018, which claims the benefit of priority of Chinese Patent Application No. 201810938418.5 filed on Aug. 17, 2018. The contents of the above applications are all incorporated by reference as if fully set forth herein in their entirety.

FIELD AND BACKGROUND OF THE INVENTION

The present applicant relates to display technologies, and more particularly, to a method and a device for correcting color deviation for a bending region of a curved screen.

As a type of current-mode light emitting devices, organic light emitting diode (OLED) display screens have been increasingly used in high-performance display technologies. In comparison with liquid crystal displays (LCDs), active-matrix OLED (AMOLED) displays have advantages such as high contrast, ultra-thinness, bendability, and etc. because of a self-luminescence function. Also, curved OLED display screens have been increasingly used in cell phone display technologies.

Because of inhomogeneity of self-luminescence of OLEDs, Mura defects will appear in displaying images. This results in various types of marks. It needs to adopt DeMura technologies to eliminate these Mura defects. However, in performing DeMura for the curved OLED display screens, using a camera to photograph a bending region usually causes color deviation in the bending region after DeMura compensation due to angular differences. This will affect a display effect.

SUMMARY OF THE INVENTION

The objective of embodiments of the present application is to provide a method and a device for correcting color deviation for a bending region of a curved screen, which has beneficial effects of improving display quality.

An embodiment of the present application provides a method for correcting color deviation for a bending region of a curved screen, the curved screen including a planar region and a curved region, the method including steps of:

obtaining first photographed images taken at a plurality of angles in displaying single-color screens with different gray levels on the planar region of the curved screen, and obtaining brightness information of each of the first photographed images;

according to the brightness information of each of the colors, establishing a relational model indicating corresponding brightness of subpixels of each of the colors under different gray levels and different angles, and according to the relational model, obtaining differences between the brightness yielded at a zero angle and the brightness yielded at each of the angles;

obtaining second photographed images taken at a plurality of angles in displaying the single-color screens with different gray levels on a full region of the curved screen, and obtaining brightness distribution information of each of the second photographed images;

correcting the brightness distribution information based on the relational model to obtain brightness data of the curved region corresponding to the zero angle;

obtaining measured brightness values at a current gray level, and calculating gray level correction values for the preset gray level based on the measured brightness values and the brightness data;

correcting the color deviation based on the gray level correction values.

In the method for correcting the color deviation for the bending region of the curved screen, the step of obtaining the first photographed images taken at the plurality of angles in displaying single-color screens with different gray levels on the planar region of the curved screen, and obtaining the brightness information of each of the first photographed images includes:

obtaining the first photographed images taken at the plurality of angles in displaying red screens with different gray levels on the planar region of the curved screen, and obtaining first brightness information of each of the first photographed images;

obtaining the first photographed images taken at the plurality of angles in displaying green screens with different gray levels on the planar region of the curved screen, and obtaining second brightness information of each of the first photographed images;

obtaining the first photographed images taken at the plurality of angles in displaying blue screens with different gray levels on the planar region of the curved screen, and obtaining third brightness information of each of the first photographed images.

In the method for correcting the color deviation for the bending region of the curved screen, the step of obtaining measured brightness values at a current gray level, and calculating gray level correction values for the preset gray level based on the measured brightness values and the brightness data includes:

selecting the brightness information corresponding to different gray levels from the brightness data to establish a correlation between the gray level and the brightness value of each of the subpixels;

obtaining the measured brightness values at the current gray level, and calculating the gray level correction values for the preset gray level based on the measured brightness values and the correlation.

In the method for correcting the color deviation for the bending region of the curved screen, the step of selecting the brightness information corresponding to different gray levels from the brightness data to establish a correlation between the gray level and the brightness value of each of the subpixels includes:

selecting the brightness information corresponding to different gray levels from the brightness data;

fitting the brightness information corresponding to different gray levels using a least square approach to obtain the correlation between the gray level and the brightness value.

In the method for correcting the color deviation for the bending region of the curved screen, the step of obtaining second photographed images taken at a plurality of angles in displaying the single-color screens with different gray levels on the full region of the curved screen, and obtaining brightness distribution information of each of the second photographed images includes:

obtaining the second photographed images taken at the plurality of angles in displaying red screens with different gray levels on the full region of the curved screen, and obtaining first brightness distribution information of each of the second photographed images;

obtaining the second photographed images taken at the plurality of angles in displaying green screens with different gray levels on the full region of the curved screen, and obtaining second brightness distribution information of each of the second photographed images;

obtaining the second photographed images taken at the plurality of angles in displaying blue screens with different gray levels on the full region of the curved screen, and obtaining third brightness distribution information of each of the second photographed images.

An embodiment of the present application further provides a method for correcting color deviation for a bending region of a curved screen, the curved screen including a planar region and a curved region, the method including steps of:

obtaining first photographed images taken at a plurality of angles in displaying single-color screens with different gray levels on the planar region of the curved screen, and obtaining brightness information of each of the first photographed images;

according to the brightness information of each of the colors, establishing a relational model indicating corresponding brightness of subpixels of each of the colors under different gray levels and different angles;

obtaining second photographed images taken at a plurality of angles in displaying the single-color screens with different gray levels on a full region of the curved screen, and obtaining brightness distribution information of each of the second photographed images;

correcting the brightness distribution information based on the relational model to obtain brightness data of the curved region corresponding to a zero angle;

obtaining measured brightness values at a current gray level, and calculating gray level correction values for the preset gray level based on the measured brightness values and the brightness data;

correcting the color deviation based on the gray level correction values.

In the method for correcting the color deviation for the bending region of the curved screen, the step of obtaining the first photographed images taken at the plurality of angles in displaying single-color screens with different gray levels on the planar region of the curved screen, and obtaining the brightness information of each of the first photographed images includes:

obtaining the first photographed images taken at the plurality of angles in displaying red screens with different gray levels on the planar region of the curved screen, and obtaining first brightness information of each of the first photographed images;

obtaining the first photographed images taken at the plurality of angles in displaying green screens with different gray levels on the planar region of the curved screen, and obtaining second brightness information of each of the first photographed images;

obtaining the first photographed images taken at the plurality of angles in displaying blue screens with different gray levels on the planar region of the curved screen, and obtaining third brightness information of each of the first photographed images.

In the method for correcting the color deviation for the bending region of the curved screen, the step of obtaining measured brightness values at a current gray level, and calculating gray level correction values for the preset gray level based on the measured brightness values and the brightness data includes:

selecting the brightness information corresponding to different gray levels from the brightness data to establish a correlation between the gray level and the brightness value of each of the subpixels;

obtaining the measured brightness values at the current gray level, and calculating the gray level correction values for the preset gray level based on the measured brightness values and the correlation.

In the method for correcting the color deviation for the bending region of the curved screen, the step of selecting the brightness information corresponding to different gray levels from the brightness data to establish the correlation between the gray level and the brightness value of each of the subpixels includes:

selecting the brightness information corresponding to different gray levels from the brightness data;

fitting the brightness information corresponding to different gray levels using a least square approach to obtain the correlation between the gray level and the brightness value.

In the method for correcting the color deviation for the bending region of the curved screen, the step of obtaining second photographed images taken at a plurality of angles in displaying the single-color screens with different gray levels on the full region of the curved screen, and obtaining brightness distribution information of each of the second photographed images includes:

obtaining the second photographed images taken at the plurality of angles in displaying red screens with different gray levels on the full region of the curved screen, and obtaining first brightness distribution information of each of the second photographed images;

obtaining the second photographed images taken at the plurality of angles in displaying green screens with different gray levels on the full region of the curved screen, and obtaining second brightness distribution information of each of the second photographed images;

obtaining the second photographed images taken at the plurality of angles in displaying blue screens with different gray levels on the full region of the curved screen, and obtaining third brightness distribution information of each of the second photographed images.

A device for correcting color deviation for a bending region of a curved screen includes:

a first obtaining module, configured to obtain first photographed images taken at a plurality of angles in displaying single-color screens with different gray levels on a planar region of the curved screen, and obtain brightness information of each of the first photographed images;

an establishing module, configured to, according to the brightness information of each of the colors, establish a relational model indicating corresponding brightness of subpixels of each of the colors under different gray levels and different angles;

a second obtaining module, configured to obtain second photographed images taken at a plurality of angles in displaying the single-color screens with different gray levels on a full region of the curved screen, and obtain brightness distribution information of each of the second photographed images;

a third obtaining module, configured to correct the brightness distribution information based on the relational model to obtain brightness data of the curved region corresponding to a zero angle;

a fourth obtaining module, configured to obtain measured brightness values at a current gray level, and calculate gray level correction values for the preset gray level based on the measured brightness values and the brightness data;

a correcting module, configured to correct the color deviation based on the gray level correction values.

In the device for correcting the color deviation for the bending region of the curved screen, the first obtaining module includes:

a first obtaining unit, configured to obtain the first photographed images taken at the plurality of angles in displaying red screens with different gray levels on the planar region of the curved screen, and obtain first brightness information of each of the first photographed images;

a second obtaining unit, configured to obtain the first photographed images taken at the plurality of angles in displaying green screens with different gray levels on the planar region of the curved screen, and obtain second brightness information of each of the first photographed images;

a third obtaining unit, configured to obtain the first photographed images taken at the plurality of angles in displaying blue screens with different gray levels on the planar region of the curved screen, and obtain third brightness information of each of the first photographed images.

In the device for correcting the color deviation for the bending region of the curved screen, the fourth obtaining module includes:

a fitting unit, configured to select the brightness information corresponding to different gray levels from the brightness data to establish a correlation between the gray level and the brightness value of each of the subpixels;

a calculating unit, configured to obtain the measured brightness values at the current gray level, and calculate the gray level correction values for the preset gray level based on the measured brightness values and the correlation.

In the device for correcting the color deviation for the bending region of the curved screen, the fitting module is configured for:

selecting the brightness information corresponding to different gray levels from the brightness data;

fitting the brightness information corresponding to different gray levels using a least square approach to obtain the correlation between the gray level and the brightness value.

In the device for correcting the color deviation for the bending region of the curved screen, the second obtaining module is configured for:

obtaining the second photographed images taken at the plurality of angles in displaying red screens with different gray levels on the full region of the curved screen, and obtaining first brightness distribution information of each of the second photographed images;

obtaining the second photographed images taken at the plurality of angles in displaying green screens with different gray levels on the full region of the curved screen, and obtaining second brightness distribution information of each of the second photographed images;

obtaining the second photographed images taken at the plurality of angles in displaying blue screens with different gray levels on the full region of the curved screen, and obtaining third brightness distribution information of each of the second photographed images.

A storage medium stores software program. When executed on a computer, the software program makes the computer executing any one of the afore-mentioned method features.

A terminal includes a processor and a memory. The memory stores a software program. The processor accesses the software program stored in the memory to execute any one of the aforementioned method features.

By obtaining first photographed images taken at a plurality of angles in displaying single-color screens with different gray levels on the planar region of the curved screen, and obtaining brightness information of each of the first photographed images; according to the brightness information of each of the colors establishing a relational model indicating corresponding brightness of subpixels of each of the colors under different gray levels and different angles, and according to the relational model obtaining differences between the brightness yielded at a zero angle and the brightness yielded at each of the angles; obtaining second photographed images taken at a plurality of angles in displaying the single-color screens with different gray levels on a full region of the curved screen, and obtaining brightness distribution information of each of the second photographed images; correcting the brightness distribution information based on the relational model to obtain brightness data of the curved region corresponding to the zero angle; obtaining measured brightness values at a current gray level, and calculating gray level correction values for the preset gray level based on the measured brightness values and the brightness data; correcting the color deviation based on the gray level correction values, the present application achieve color deviation correction, and has beneficial effects of improving display quality and lowering color deviation.

BRIEF DESCRIPTION OF THE SEVERAL VIEWS OF THE DRAWINGS

To illustrate the technical solutions in the embodiments of the present application more clearly, the following briefly introduces the accompanying drawings required for describing the embodiments of the present application. Apparently, the accompanying drawings in the following description show some embodiments of the present application, and a person of ordinary skill in the art may still derive other drawings from these accompanying drawings without creative efforts.

DESCRIPTION OF SPECIFIC EMBODIMENTS OF THE INVENTION

Figure 1:
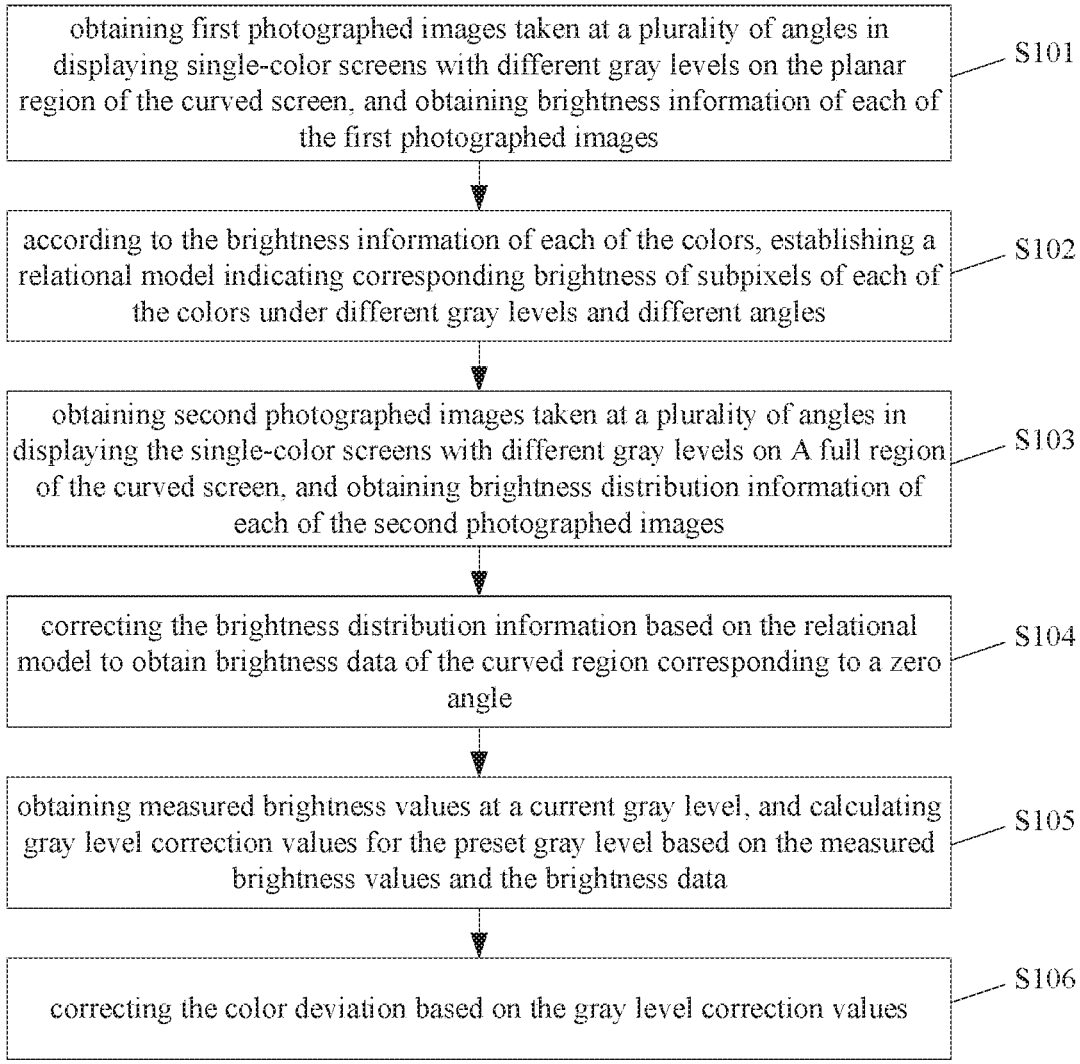
FIG. 1 is a flowchart of a method for correcting color deviation for a bending region of a curved screen in accordance with an embodiment of the present application.

The embodiments of the present application will be described in detail below. The embodiments are illustrated in the appending drawings, in which the same or similar reference numbers are throughout referred to as the same or similar components or the components having the same or similar functions. The embodiments described below with reference to the appending drawings are exemplary and are merely used to illustrate the present application, and should not be construed as limitations of the present application.

In the description of the present application, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like indicated orientation or positional relationship based on the relationship of the position or orientation shown in the drawings, which is only for the purpose of facilitating describing the description and simplifying the description, but is not intended or implied that the device or element referred to must have a specific orientation, and be constructed and operated in a particular orientation. Therefore, it should not be understood as a limitation of the present application. In addition, terms such as "first" and "second" are used herein for purposes of description and are not intended to indicate or imply relative importance or imply the number of features. Thus, the feature defined with "first" and "second" may include one or more of this feature. In the description of the present application, "a plurality of" means two or more than two, unless specified otherwise.

In the description of the present application, it is noted that unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present application, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above" or "on top of" a second feature may include an embodiment in which the first feature is right or obliquely "on," "above" or "on top of" the second feature, or just means that the first feature is at a height higher than that of the second feature; while a first feature "below," "under" or "on bottom of" a second feature may include an embodiment in which the first feature is right or obliquely "below," "under" or "on bottom of" the second feature, or just means that the first feature is at a height lower than that of the second feature.

The following disclosure provides many different embodiments or examples to implement different structures of the present application. In order to simplify the disclosure of the present application, the components and arrangements of specific examples are described in the following. Apparently, they are just exemplary, and do not intend to limit the present application. In addition, reference numbers and/or letters can be repeated in different examples of the present application for the purposes of simplification and clearness, without indicating the relationships between the discussed embodiments and/or arrangements. Further, the present application provides examples of various specific processes and materials, but an ordinary person in the art can realize the availability of other processes and/or usage of other materials.

FIG. 1 is a flowchart of a method for correcting color deviation for a bending region of a curved screen in accordance with an embodiment of the present application. The curved screen includes a planar region and a curved region. The method includes the following steps.

Step S101—obtaining first photographed images taken at a plurality of angles in displaying single-color screens with different gray levels on the planar region of the curved screen, and obtaining brightness information of each of the first photographed images.

This step specifically includes obtaining the first photographed images taken at the plurality of angles in displaying red screens with different gray levels on the planar region of the curved screen, and obtaining first brightness information of each of the first photographed images; obtaining the first photographed images taken at the plurality of angles in displaying green screens with different gray levels on the planar region of the curved screen, and obtaining second brightness information of each of the first photographed images; obtaining the first photographed images taken at the plurality of angles in displaying blue screens with different gray levels on the planar region of the curved screen, and obtaining third brightness information of each of the first photographed images. The first brightness information, the second brightness information, and the third brightness information construct the brightness information.

Step S102—according to the brightness information of each of the colors establishing a relational model indicating corresponding brightness of subpixels of each of the colors under different gray levels and different angles.

This step may further include according to the relational model obtaining differences between the brightness yielded at a zero angle and the brightness yielded at each of the angles. Induction or general algorithms may be adopted to establish the relational model with gray level-angle-brightness mapping based on corrected brightness information.

Step S103—obtaining second photographed images taken at a plurality of angles in displaying the single-color screens with different gray levels on a full region of the curved screen, and obtaining brightness distribution information of each of the second photographed images.

Step S103 specifically includes obtaining the second photographed images taken at the plurality of angles in displaying red screens with different gray levels on the full region of the curved screen, and obtaining first brightness distribution information of each of the second photographed images; obtaining the second photographed images taken at the plurality of angles in displaying green screens with different gray levels on the full region of the curved screen, and obtaining second brightness distribution information of each of the second photographed images; obtaining the second photographed images taken at the plurality of angles in displaying blue screens with different gray levels on the full region of the curved screen, and obtaining third brightness distribution information of each of the second photographed images. The first brightness distribution information, the second brightness distribution information, and the third brightness distribution information construct the brightness distribution information of each of the second photographed images.

Step S104—correcting the brightness distribution information based on the relational model to obtain brightness data of the curved region corresponding to the zero angle.

In this step, the relational model established in Step S102 may be utilized to correct the brightness distribution information obtained from Step S103, and to calculate the brightness data of the curved region corresponding to the zero angle.

According to the brightness information of each of the colors, the relational model indicating corresponding brightness of subpixels of each of the colors under different gray levels and different angles is established. In the context, a functional relation might be assumed to be $L=a*(g+\theta)^\gamma$, where g represents the gray levels, L represents the brightness values, γ represents gamma values, θ indicates the angles, and a is a coefficient. Optical brightness data corresponding to different gray levels are used to fit the functional relation for each of the subpixels to obtain a specific relationship. When 0 is zero, corrected brightness data can be obtained.

Step S105—obtaining measured brightness values at a current gray level, and calculating gray level correction values for the preset gray level based on the measured brightness values and the brightness data.

In this step, the brightness data may be utilized to compute a correlation between the gray level and the brightness value, and then the correlation is utilized to calculate the gray level correcting values.

Specifically, Step S105 includes selecting the brightness information corresponding to different gray levels from the brightness data to establish the correlation between the gray level and the brightness value of each of the subpixels; obtaining the measured brightness values at the current gray level, and calculating the gray level correction values for the preset gray level based on the measured brightness values and the correlation.

The following steps may be utilized to compute a correlation—selecting the brightness information corresponding to different gray levels from the brightness data; fitting the brightness information corresponding to different gray levels using a least square approach to obtain the correlation between the gray level and the brightness value.

Step S106—correcting the color deviation based on the gray level correction values.

In this step, compensation values for the subpixels R/G/B are put together to obtain a DeMura compensation table, and then the DeMura compensation table is written to a flash memory to achieve a DeMura function.

As can be seen, the present application obtains the first photographed images taken at a plurality of angles in displaying the single-color screens with different gray levels on the planar region of the curved screen, and by the first photographed images, obtains the brightness information of each of the first photographed images; according to the brightness information of each of the colors, establishing a relational model indicating corresponding brightness of subpixels of each of the colors under different gray levels and different angles, and according to the relational model, obtaining the differences between the brightness yielded at the zero angle and the brightness yielded at each of the angles; obtaining the second photographed images taken at the plurality of angles in displaying the single-color screens with different gray levels on the full region of the curved screen, and obtaining brightness distribution information of each of the second photographed images; correcting the brightness distribution information based on the relational model to obtain brightness data of the curved region corresponding to the zero angle; obtaining measured brightness values at a current gray level, and calculating gray level correction values for the preset gray level based on the measured brightness values and the brightness data; correcting the color deviation based on the gray level correction values, the present application achieves color deviation correction, and has beneficial effects of improving display quality and lowering color deviation.

Figure 2:
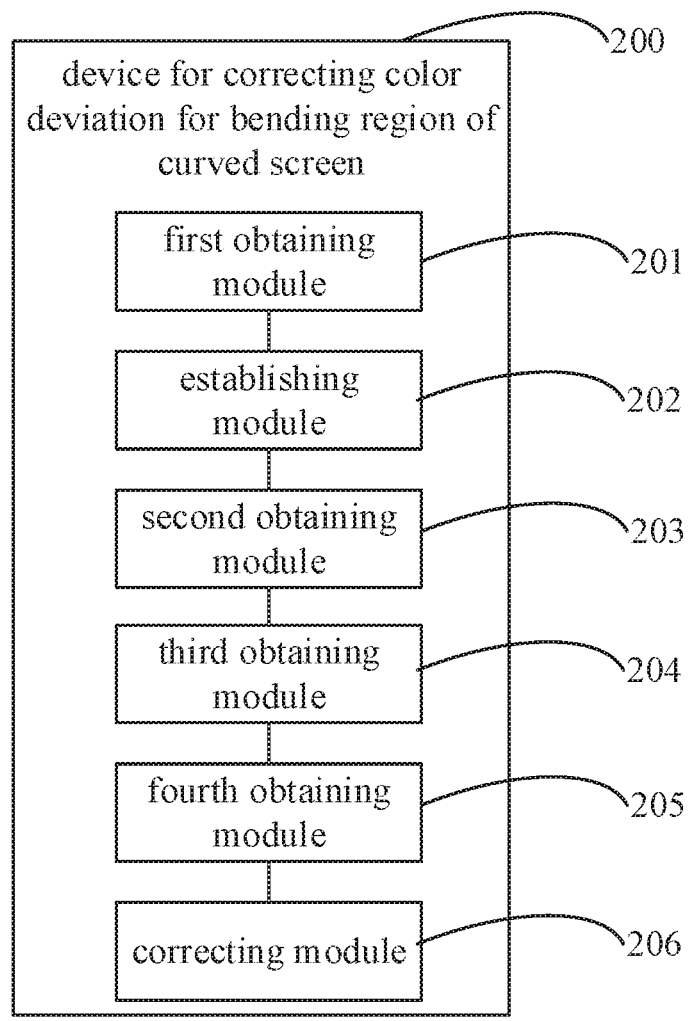
FIG. 2 is a structural diagram illustrating a device for correcting color deviation for a bending region of a curved screen in accordance with an embodiment of the present application.

FIG. 2 is a structural diagram illustrating a device for correcting color deviation for a bending region of a curved screen in accordance with an embodiment of the present application. The device includes a first obtaining module 201, an establishing module 202, a second obtaining module 203, a third obtaining module 204, a fourth obtaining module 205, and a correcting module 206.

The first obtaining module 201 is configured to obtain first photographed images taken at a plurality of angles in displaying single-color screens with different gray levels on the planar region of the curved screen, and obtain brightness information of each of the first photographed images. The first obtaining module includes a first obtaining unit, configured to obtain the first photographed images taken at the plurality of angles in displaying red screens with different gray levels on the planar region of the curved screen, and obtain first brightness information of each of the first photographed images; a second obtaining unit, configured to obtain the first photographed images taken at the plurality of angles in displaying green screens with different gray levels on the planar region of the curved screen, and obtain second brightness information of each of the first photographed images; a third obtaining unit, configured to obtain the first photographed images taken at the plurality of angles in displaying blue screens with different gray levels on the planar region of the curved screen, and obtain third brightness information of each of the first photographed images.

The establishing module 202 is configured to, according to the brightness information of each of the colors, establish a relational model indicating corresponding brightness of subpixels of each of the colors under different gray levels and different angles.

The second obtaining module 203 is configured to obtain second photographed images taken at a plurality of angles in displaying the single-color screens with different gray levels on a full region of the curved screen, and obtain brightness distribution information of each of the second photographed images.

The third obtaining module 204 is configured to correct the brightness distribution information based on the relational model to obtain brightness data of the curved region corresponding to a zero angle. The fourth obtaining module 205 is configured to obtain measured brightness values at a current gray level, and calculate gray level correction values for the preset gray level based on the measured brightness values and the brightness data.

The fourth obtaining module 205 includes a fitting unit, configured to select the brightness information corresponding to different gray levels from the brightness data to establish a correlation between the gray level and the brightness value of each of the subpixels; a calculating unit, configured to obtain the measured brightness values at the current gray level, and calculate the gray level correction values for the preset gray level based on the measured brightness values and the correlation. The following steps may be utilized to compute the correlation—selecting the brightness information corresponding to different gray levels from the brightness data; fitting the brightness information corresponding to different gray levels using a least square approach to obtain the correlation between the gray level and the brightness value.

The correcting module 206 is configured to correct the color deviation based on the gray level correction values. Compensation values for the subpixels R/G/B are put together to obtain a DeMura compensation table, and then the DeMura compensation table is written to a flash memory to achieve a DeMura function.

As can be seen, the present application obtains first photographed images taken at a plurality of angles in displaying single-color screens with different gray levels on the planar region of the curved screen, and by the first photographed images, obtains the brightness information of each of the first photographed images; according to the brightness information of each of the colors, establishing a relational model indicating corresponding brightness of subpixels of each of the colors under different gray levels and different angles, and according to the relational model, obtaining differences between the brightness yielded at the zero angle and the brightness yielded at each of the angles; obtaining second photographed images taken at a plurality of angles in displaying the single-color screens with different gray levels on the full region of the curved screen, and obtaining the brightness distribution information of each of the second photographed images; correcting the brightness distribution information based on the relational model to obtain brightness data of the curved region corresponding to the zero angle; obtaining measured brightness values at a current gray level, and calculating gray level correction values for the preset gray level based on the measured brightness values and the brightness data; correcting the color deviation based on the gray level correction values, the present application achieves color deviation correction, and has beneficial effects of improving display quality and lowering color deviation.

Figure 3:
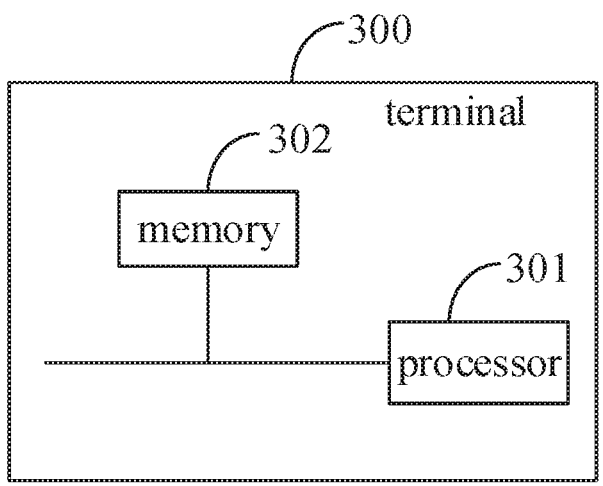
FIG. 3 is a structural diagram illustrating a terminal in accordance with an embodiment of the present application.

Referring to FIG. 3, the present application further provides a terminal 300 including a processor and a memory. The memory stores a software program. The processor accesses the software program stored in the memory to execute any one of the aforementioned method features. The terminal 300 includes the processor 301 and the memory 302. The processor 301 is electrically connected to the memory 302.

The processor 301 is a control center of the terminal 300, and is connected to various parts of the terminal by using various interfaces and lines. By running or calling the software program stored in the memory 302, and invoking data stored in the memory 302, the processor 301 performs various functions and data processing of the terminal, thereby overall monitoring and controlling the terminal.

In the present embodiment, the processor 301 of the terminal 300 will load instructions corresponding to one or more than one processes of the software program into the memory 302 based on the following steps, and the software program stored in the memory 302 is executed by the processor 301 to achieve various functions, for example, by obtaining first photographed images taken at a plurality of angles in displaying single-color screens with different gray levels on the planar region of the curved screen, obtaining brightness information of each of the first photographed images; according to the brightness information of each of the colors, establishing a relational model indicating corresponding brightness of subpixels of each of the colors under different gray levels and different angles, and according to the relational model, obtaining differences between the brightness yielded at a zero angle and the brightness yielded at each of the angles; obtaining second photographed images taken at a plurality of angles in displaying the single-color screens with different gray levels on a full region of the curved screen, and obtaining brightness distribution information of each of the second photographed images; correcting the brightness distribution information based on the relational model to obtain brightness data of the curved region corresponding to the zero angle; obtaining measured brightness values at a current gray level, and calculating gray level correction values for the preset gray level based on the measured brightness values and the brightness data; correcting the color deviation based on the gray level correction values.

An embodiment of the present application further provides a storage medium. The storage medium stores a software program. When executed on a computer, the software program makes the computer to execute any one of the aforementioned method features.

It is noted that a person of ordinary skill in the art can realize that part or whole of the steps in the methods according to the above embodiments may be implemented by a program instructing relevant hardware. The program may be stored in a computer readable storage medium. The storage medium may include a read-only memory (ROM), a random access memory (RAM), a magnetic disk, or an optical disk, et al, but is not limited thereto.

Detail descriptions of the method and device for correcting color deviation for the bending region of the curved screen, the storage medium, and the terminal provided in the embodiments of the present application are presented above. Specific examples are used in the context in illustrating the principles and embodiments of the present application. The descriptions of foregoing embodiments are only intended to facilitate understanding the present application. Any modification made to the embodiments and applications may be made by persons of ordinary skills in the art based on ideas of the present application. Above all, the present specification should not be understood as limitation to the present application.

What is claimed is:

1. A method for correcting color deviation for a bending region of a curved screen, the curved screen comprising a planar region and a curved region, the method comprising steps of:

obtaining first photographed images taken at a plurality of angles in displaying single-color screens with different gray levels on the planar region of the curved screen, and obtaining brightness information of each of the first photographed images;

according to the brightness information of each of the colors, establishing a relational model indicating corresponding brightness of subpixels of each of the colors under different gray levels and different angles, and according to the relational model, obtaining differences between the brightness yielded at a zero angle and the brightness yielded at each of the angles;

obtaining second photographed images taken at a plurality of angles in displaying the single-color screens with different gray levels on a full region of the curved screen, and obtaining brightness distribution information of each of the second photographed images;

correcting the brightness distribution information based on the relational model to obtain brightness data of the curved region corresponding to the zero angle;

obtaining measured brightness values at a current gray level, and calculating gray level correction values for the preset gray level based on the measured brightness values and the brightness data;

correcting the color deviation based on the gray level correction values;

wherein the step of obtaining measured brightness values at a current gray level, and calculating gray level correction values for the preset gray level based on the measured brightness values and the brightness data comprises: selecting the brightness information corresponding to different gray levels from the brightness data to establish a correlation between the gray level and the brightness value of each of the subpixels; obtaining the measured brightness values at the current gray level, and calculating the gray level correction values for the preset gray level based on the measured brightness values and the correlation; and wherein the step of selecting the brightness information corresponding to different gray levels from the brightness data to establish a correlation between the gray level and the brightness value of each of the subpixels comprises: selecting the brightness information corresponding to different gray levels from the brightness data; fitting the brightness information corresponding to different gray levels using a least square approach to obtain the correlation between the gray level and the brightness value.

2. The method according to claim 1, wherein the step of obtaining the first photographed images taken at the plurality of angles in displaying single-color screens with different gray levels on the planar region of the curved screen, and obtaining the brightness information of each of the first photographed images comprises:

obtaining the first photographed images taken at the plurality of angles in displaying red screens with different gray levels on the planar region of the curved screen, and obtaining first brightness information of each of the first photographed images;

obtaining the first photographed images taken at the plurality of angles in displaying green screens with different gray levels on the planar region of the curved screen, and obtaining second brightness information of each of the first photographed images;

obtaining the first photographed images taken at the plurality of angles in displaying blue screens with different gray levels on the planar region of the curved screen, and obtaining third brightness information of each of the first photographed images.

3. The method according to claim 1, wherein the step of obtaining second photographed images taken at a plurality of angles in displaying the single-color screens with different gray levels on the full region of the curved screen, and obtaining brightness distribution information of each of the second photographed images comprises:

obtaining the second photographed images taken at the plurality of angles in displaying red screens with different gray levels on the full region of the curved screen, and obtaining first brightness distribution information of each of the second photographed images;

obtaining the second photographed images taken at the plurality of angles in displaying green screens with different gray levels on the full region of the curved screen, and obtaining second brightness distribution information of each of the second photographed images;

obtaining the second photographed images taken at the plurality of angles in displaying blue screens with different gray levels on the full region of the curved screen, and obtaining third brightness distribution information of each of the second photographed images.

4. A method for correcting color deviation for a bending region of a curved screen, the curved screen comprising a planar region and a curved region, the method comprising steps of:

obtaining first photographed images taken at a plurality of angles in displaying single-color screens with different gray levels on the planar region of the curved screen, and obtaining brightness information of each of the first photographed images;

according to the brightness information of each of the colors, establishing a relational model indicating corresponding brightness of subpixels of each of the colors under different gray levels and different angles;

obtaining second photographed images taken at a plurality of angles in displaying the single-color screens with different gray levels on a full region of the curved screen, and obtaining brightness distribution information of each of the second photographed images;

correcting the brightness distribution information based on the relational model to obtain brightness data of the curved region corresponding to a zero angle;

obtaining measured brightness values at a current gray level, and calculating gray level correction values for the preset gray level based on the measured brightness values and the brightness data;

correcting the color deviation based on the gray level correction values;

wherein the step of obtaining measured brightness values at a current gray level, and calculating gray level correction values for the preset gray level based on the measured brightness values and the brightness data comprises: selecting the brightness information corresponding to different gray levels from the brightness data to establish a correlation between the gray level and the brightness value of each of the subpixels; obtaining the measured brightness values at the current gray level, and calculating the gray level correction values for the preset gray level based on the measured brightness values and the correlation; and wherein the step of selecting the brightness information corresponding to different gray levels from the brightness data to establish the correlation between the gray level and the brightness value of each of the subpixels comprises: selecting the brightness information corresponding to different gray levels from the brightness data; fitting the brightness information corresponding to different gray levels using a least square approach to obtain the correlation between the gray level and the brightness value.

5. The method according to claim 4, wherein the step of obtaining the first photographed images taken at the plurality of angles in displaying single-color screens with different gray levels on the planar region of the curved screen, and obtaining the brightness information of each of the first photographed images comprises:

obtaining the first photographed images taken at the plurality of angles in displaying red screens with different gray levels on the planar region of the curved screen, and obtaining first brightness information of each of the first photographed images;

obtaining the first photographed images taken at the plurality of angles in displaying green screens with different gray levels on the planar region of the curved screen, and obtaining second brightness information of each of the first photographed images;

obtaining the first photographed images taken at the plurality of angles in displaying blue screens with different gray levels on the planar region of the curved screen, and obtaining third brightness information of each of the first photographed images.

6. The method according to claim 4, wherein the step of obtaining second photographed images taken at a plurality of angles in displaying the single-color screens with different gray levels on the full region of the curved screen, and obtaining the brightness distribution information of each of the second photographed images comprises:

obtaining the second photographed images taken at the plurality of angles in displaying red screens with different gray levels on the full region of the curved screen, and obtaining first brightness distribution information of each of the second photographed images;

obtaining the second photographed images taken at the plurality of angles in displaying green screens with different gray levels on the full region of the curved screen, and obtaining second brightness distribution information of each of the second photographed images;

obtaining the second photographed images taken at the plurality of angles in displaying blue screens with different gray levels on the full region of the curved screen, and obtaining third brightness distribution information of each of the second photographed images.

7. A device for correcting color deviation for a bending region of a curved screen, comprising:

a first obtaining module, configured to obtain first photographed images taken at a plurality of angles in displaying single-color screens with different gray levels on a planar region of the curved screen, and obtain brightness information of each of the first photographed images;

an establishing module, configured to, according to the brightness information of each of the colors, establish a relational model indicating corresponding brightness of subpixels of each of the colors under different gray levels and different angles;

a second obtaining module, configured to obtain second photographed images taken at a plurality of angles in displaying the single-color screens with different gray levels on a full region of the curved screen, and obtain brightness distribution information of each of the second photographed images;

a third obtaining module, configured to correct the brightness distribution information based on the relational model to obtain brightness data of the curved region corresponding to a zero angle;

a fourth obtaining module, configured to obtain measured brightness values at a current gray level, and calculate gray level correction values for the preset gray level based on the measured brightness values and the brightness data;

a correcting module, configured to correct the color deviation based on the gray level correction values;

wherein the fourth obtaining module comprises: a fitting unit, configured to select the brightness information corresponding to different gray levels from the brightness data to establish a correlation between the gray level and the brightness value of each of the subpixels; a calculating unit, configured to obtain the measured brightness values at the current gray level, and calculate the gray level correction values for the preset gray level based on the measured brightness values and the correlation; and wherein the fitting module is configured for: selecting the brightness information corresponding to different gray levels from the brightness data; fitting the brightness information corresponding to different gray levels using a least square approach to obtain the correlation between the gray level and the brightness value.

8. The device according to claim 7, wherein the first obtaining module comprises:

a first obtaining unit, configured to obtain the first photographed images taken at the plurality of angles in displaying red screens with different gray levels on the planar region of the curved screen, and obtain first brightness information of each of the first photographed images;

a second obtaining unit, configured to obtain the first photographed images taken at the plurality of angles in displaying green screens with different gray levels on the planar region of the curved screen, and obtain second brightness information of each of the first photographed images;

a third obtaining unit, configured to obtain the first photographed images taken at the plurality of angles in displaying blue screens with different gray levels on the planar region of the curved screen, and obtain third brightness information of each of the first photographed images.

9. The device according to claim 7, wherein the second obtaining module is configured for:

obtaining the second photographed images taken at the plurality of angles in displaying red screens with different gray levels on the full region of the curved screen, and obtaining first brightness distribution information of each of the second photographed images;

obtaining the second photographed images taken at the plurality of angles in displaying green screens with different gray levels on the full region of the curved screen, and obtaining second brightness distribution information of each of the second photographed images;

obtaining the second photographed images taken at the plurality of angles in displaying blue screens with different gray levels on the full region of the curved screen, and obtaining third brightness distribution information of each of the second photographed images.

\* \* \* \* \*